(12) United States Patent
A et al.

(10) Patent No.: US 11,140,049 B2
(45) Date of Patent: Oct. 5, 2021

(54) DYNAMIC INTENT ASSURANCE AND PROGRAMMABILITY IN COMPUTER NETWORKS

(71) Applicant: Juniper Networks, Inc., Sunnyvale, CA (US)

(72) Inventors: Chandrasekhar A, Bangalore (IN); Nirmal Anburose, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 7 days.

(21) Appl. No.: 16/125,245

(22) Filed: Sep. 7, 2018

(65) Prior Publication Data
US 2020/0084120 A1    Mar. 12, 2020

(51) Int. Cl.
H04L 12/24    (2006.01)

(52) U.S. Cl.
CPC ...... H04L 41/5019 (2013.01); H04L 41/0213 (2013.01)

(58) Field of Classification Search
USPC .......................................................... 709/226
See application file for complete search history.

(56) References Cited

U.S. PATENT DOCUMENTS

| | | | | |
|---|---|---|---|---|
| 2006/0010234 A1* | 1/2006 | Reedy | ..................... | G06F 9/542 |
| | | | | 709/224 |
| 2010/0049837 A1* | 2/2010 | Ji | ........................ | H04L 41/0813 |
| | | | | 709/220 |
| 2011/0010518 A1* | 1/2011 | Kavuri | .................. | G06F 16/217 |
| | | | | 711/165 |
| 2013/0138806 A1* | 5/2013 | Gohad | .................. | G06F 9/5072 |
| | | | | 709/224 |
| 2013/0346543 A1* | 12/2013 | Benantar | ............... | G06F 9/5055 |
| | | | | 709/217 |

(Continued)

OTHER PUBLICATIONS

Harrington et al., RFC 3411, "An Architecture for Describing Simple Network Management Protocol (SNMP) Management Frameworks," Network Working Group, the Internet Engineering Task Force draft, Dec. 2002, 65 pp.

(Continued)

*Primary Examiner* — Hermon Asres
(74) *Attorney, Agent, or Firm* — Shumaker & Sieffert P.A.

(57) ABSTRACT

In general, techniques are described for automatic intent provisioning and management in computer networks. A device comprising a processor, a memory, and an interface may perform the techniques. The processor may obtain a policy that includes high-level configuration data defining a service to be deployed within a network, the high-level configuration data including resource selector criteria that identifies one or more criteria for selecting a resource to support the service from a plurality of potential resources. The processor may also determine, based on the resource selector criteria, the resource to support the service from the plurality of potential resources, and translate the high-level configuration data to low-level configuration data specific to the determined resource. The memory may store the low-level configuration data specific to the determined resource. The interface may enable configuration, when provisioning the service, the determined resource using the low-level configuration data specific to the determined resource.

16 Claims, 5 Drawing Sheets

(56) References Cited

U.S. PATENT DOCUMENTS

2015/0066977 A1* 3/2015 Wen .................. G06F 16/24528
                                                          707/769
2017/0054758 A1   2/2017 Maino et al.
2017/0099182 A1   4/2017 DeBolle et al.

OTHER PUBLICATIONS

U.S. Appl. No. 15/198,657, filed Jun. 30, 2016, Juniper Networks, Inc. (inventor: Jiang et al.) entitled "Translating High-Level Configuration Instructions to Low-Level Device Configuration,".

Extended Search Report from counterpart European Application No. 19180763.5, dated Dec. 2, 2019, 9 pp.

Huang et al., "Building self-configuring services using service-specific knowledge". Proceedings of 13th IEEE International Symposium, Jun. 4-6, 2004, pp. 45-54.

Response filed Sep. 8, 2020 to the Extended Search Report from counterpart European Application No. 19180763.5, dated Dec. 2, 2019, 21 pp.

* cited by examiner

DYNAMIC INTENT ASSURANCE AND PROGRAMMABILITY IN COMPUTER NETWORKS

TECHNICAL FIELD

This disclosure relates to computer networks, and more particularly, to management of network devices.

BACKGROUND

Network devices may include mechanisms, such as management interfaces, for locally or remotely configuring the devices. By interacting with the management interface, a client can perform configuration tasks as well as perform operational commands to collect and view operational data of the managed devices. For example, clients may configure interface cards of a device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q Virtual Local Area Network (VLAN) Service. In order to configure devices to perform the services, a user (such as an administrator) may write translation programs that translate high-level configuration instructions (e.g., instructions according to a network service model) to low-level configuration instructions (e.g., instructions according to a device configuration model). As part of configuration service support, the user/administrator may provide a service model and a mapping between the service model to a device configuration model.

In order to simplify the mapping definition for the user, network management system (NMS) devices may be designed to provide the capability to define the mappings in a simple way. For example, some NMS devices provide the use of Velocity Templates and/or Extensible Stylesheet Language Transformations (XSLT). Such translators contain the translation or mapping logic from the high-level service model to the low-level device configuration model. Typically, a relatively small number of changes in the high-level service model impact a relatively large number of properties across device configurations. Different translators may be used when services are created, updated, and deleted from the high-level service model.

One or more policies may specify the high-level service model as an intent. For example, a policy may identify a layer two peer-to-peer (L2P2P) service between two endpoints as an intent. An administrator may then specify which of the available network devices within the computer network are to support the L2P2P service defined by the policy. The NMS may then provision the L2P2P service within the computer network via the specified network devices.

SUMMARY

In general, the disclosure describes techniques for dynamic (such as automatic) provisioning and managing of intents set forth by policies used for managing computer networks. When processing the intent, the techniques may enable a network management system (NMS) or other device provisioning system to obtain resource selector criteria (which may also be referred to as "filters") defined using an extensible set of commands. The NMS may automatically identify, using the resource selector criteria, one or more resources that are to be configured to support the network server.

The NMS may maintain a resource database and provide an interface by which to collect and update various different resources and the current status of each of the resources. Resources may refer to a device, an interface, a port, a unit of a port, and the like. The various resources may report the current status to the NMS (and/or the NMS may poll the resources to obtain the current status), where the NMS may update the database to maintain the current status of each of the resources. The NMS may select, based on the resource selector criteria, the resources, and provision the network service via the selected resources, thereby automatically provisioning the intent.

The NMS may obtain updated statuses of the resources, comparing the updated status of the resource to the resource selector criteria to determine whether the intent has been downgraded. When the resource no longer meets the resource selector criteria, the NMS may downgrade the intent, and identify another resource (which may be referred to as a replacement resource) to be used in place of the insufficient resource. The NMS may next provision the service using the replacement resource, thereby providing intent assurance, which may refer to maintaining or otherwise managing the intent to ensure adequate service levels for the network service.

In one example, various aspects of the techniques are directed to a method comprising: obtaining, by a management device, a policy that includes high-level configuration data defining a service to be deployed within a network, the high-level configuration data including resource selector criteria that identifies one or more criteria for selecting a resource to support the service from a plurality of potential resources; determining, by the management device and based on the resource selector criteria, the resource to support the service from the plurality of potential resources; translating, by the management device, the high-level configuration data to low-level configuration data specific to the determined resource; and configuring, by the management device and when provisioning the service in the network, the determined resource using the low-level configuration data specific to the determined resource.

In another example, various aspects of the techniques are directed to a device comprising: one or more processors configured to: obtain a policy that includes high-level configuration data defining a service to be deployed within a network, the high-level configuration data including resource selector criteria that identifies one or more criteria for selecting a resource to support the service from a plurality of potential resources; determine, based on the resource selector criteria, the resource to support the service from the plurality of potential resources; translate the high-level configuration data to low-level configuration data specific to the determined resource; a memory configured to store the low-level configuration data specific to the determined resource; and an interface by which to configure, when provisioning the service in the network, the determined resource using the low-level configuration data specific to the determined resource.

In another example, various aspects of the techniques are directed to a non-transitory computer-readable storage medium having stored thereon instructions that, when executed, cause one or more processors of a management device to: obtain a policy that includes high-level configuration data defining a service to be deployed within a network, the high-level configuration data including resource selector criteria that identifies one or more criteria for selecting a resource to support the service from a plurality of potential resources; determine, based on the resource selector criteria, the resource to support the service from the plurality of potential resources; translate the high-level configuration data to low-level configuration data specific to the determined resource; and configure, when provisioning the service in the network, the determined resource using the low-level configuration data specific to the determined resource.

The details of one or more examples of the techniques of this disclosure are set forth in the accompanying drawings and the description below. Other features, objects, and advantages of the techniques will be apparent from the description and drawings.

BRIEF DESCRIPTION OF DRAWINGS

Like reference characters refer to like elements throughout the figures and description.

DETAILED DESCRIPTION

Figure 1:
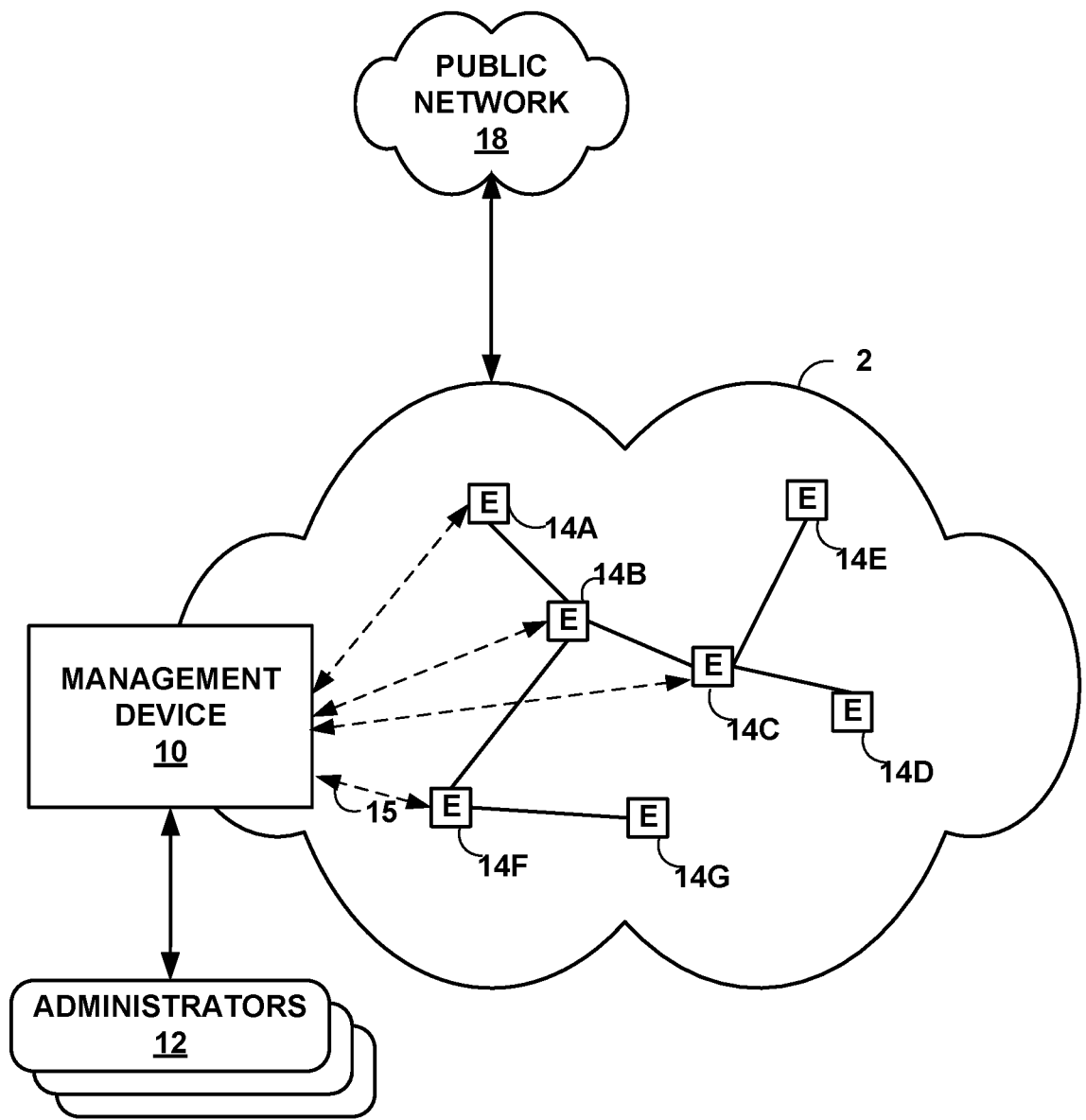
FIG. 1 is a block diagram illustrating an example network including elements of an enterprise network that are managed using a management device in accordance with various aspects of the techniques described in this disclosure.

FIG. 1 is a block diagram illustrating an example including elements of an enterprise network 2 that are managed using a management device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion detection and prevention (IDP) systems, computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management device 10 is communicatively coupled to elements 14 via enterprise network 2. Management device 10, in some examples, forms part of a device management system, although only one device of the device management system is illustrated for purpose of example in FIG. 1. Management device 10 may be coupled either directly or indirectly to various elements 14. Once elements 14 are deployed and activated, administrator 12 uses management device 10 to manage the network devices using a device management protocol. One example device protocol is the Simple Network Management Protocol (SNMP) that allows management device 10 to traverse and modify management information bases (MIB s) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In some instances, management device 10, also referred to as network management system (NMS) 10 or NMS device 10, and elements 14 are centrally maintained by an IT group of the enterprise. Administrator 12 interacts with management device 10 to remotely monitor and configure elements 14. For example, administrator 12 may receive alerts from management device 10 regarding any of elements 14, view configuration data of elements 14, modify the configurations data of elements 14, add new network devices to enterprise network 2, remove existing network devices from enterprise network 2, or otherwise manipulate enterprise network 2 and network devices therein. Although described for purposes of example with respect to an enterprise network, the techniques of this disclosure are applicable to other network types, public and private, including LANs, VLANs, VPNs, and the like.

In some examples, administrator 12 uses management device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, SSH, hypertext transfer protocol (HTTP), or other network session, to enter text in accordance with a defined syntax to submit commands to the managed element. In some examples, the user initiates an SSH session 15 with one of elements 14, i.e., element 14F in the example of FIG. 1, using management device 10, to directly configure element 14F. In this manner, a user may provide commands, in a format for execution, directly to elements 14.

Further, administrator 12 may also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on managed elements 14. The scripts may conform to, e.g., extensible markup language (XML) or another data description language.

Administrator 12 uses management device 10 to configure elements 14 to specify certain operational characteristics that further the objectives of administrator 12. For example, administrator 12 may specify, for one of elements 14, a particular operational policy regarding security, device accessibility, traffic engineering, quality of service (QoS), network address translation (NAT), packet filtering, packet forwarding, rate limiting, or other policies. Management device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Management device 10 may establish NETCONF sessions with one or more of elements 14.

Management device 10 may be configured to compare a new set of high-level configuration data to an existing (or old) set of high-level configuration data, and apply the translation functions to the differences between the new and old high-level configuration data. In particular, management device 10 determines whether the new set of configuration data includes any additional configuration parameters relative to the old set of high-level configuration data, as well as whether the new set of configuration data omits any configuration parameters that were included in the old set of high-level configuration data.

Expressed another way, let the number of types of managed devices (e.g., types of elements 14) be represented by N, let the variable y represent low-level, device-specific configuration data, and let the variable x represent high-level configuration data. Management device 10 includes N translation functions $f_1(\ ), f_2(\ ), \ldots, f_N(\ )$. These functions are configured to accept the high-level configuration data (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020). The functions are also configured to output respective sets of low-level device configuration data changes, e.g., device configuration additions and removals. That is, $y_1=f_1(x), y_2=f_2(x), \ldots y_N=f_N(x)$. Additional details regarding an example process for translating high level configuration information (or, in other words, high-level configuration data) to low-level device configuration information (or, in other words, low-level configuration data) can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference.

Management device 10 may be used within the context of software defined networks (SDNs), where management device 10 may orchestrate service deployment or provisioning within managed elements 14. Administrators 12 may define one or more policies that may specify the high-level service model as an intent that identifies generally a network service.

For example, a policy may include an intent identifying a layer two peer-to-peer (L2P2P) service and specify this service as "L2P2P service between endpoints." In other words, a policy may identify the L2PSP service and an intent as "L2P2P service between endpoints." Management device 10 may compile the intent and identify the endpoints in accordance with the intent, thereby specifying how the L2P2P service is to be deployed. Administrator 12 may then specify which of the available network devices (e.g., elements 14) within computer network 2 are to support the L2P2P service defined by the policy (e.g., by defining various criteria for selecting which of the available network devices are to support the L2P2P service, as discussed in more detail below). Management device 10 may next transform the high-level service model into the low-level service model specific to selected elements 14, and deploy the low-level service model to provision the L2P2P service within computer network 2 via specified network devices 14.

In accordance with various aspects of the techniques described in this disclosure, management device 10 may automatically provision and manage intents resulting from policies used for managing computer network 2. When processing the intent, the techniques may enable management device 10 or other device provisioning system to obtain resource selector criteria (which may also be referred to as "filters") defined using an extensible set of commands. Management device 10 may automatically identify, using the resource selector criteria, one or more resources that are to be configured to support the network service identified by the intent.

Management device 10 may maintain a resource database and provide an interface by which to collect and update various different resources and the current status of each of the resources. Resources may refer to a device (e.g., elements 14), or some component of a device, such as an interface, a port, a processing unit of a port, and the like. The various resources may report state data indicative of a current status of the resources to management device 10 (and/or management device 10 may poll the resources to obtain the state data), where management device 10 may update the database to store the state data and thereby maintain the current status of each of the resources. Management device 10 may automatically (meaning, in some examples, without manual intervention) select, based on application of the resource selector criteria to the state data, the resources, and configure, when provisioning the network service identified by the intent in the network 2, the selected resources, thereby automatically (meaning, in some examples, without manual intervention) provisioning the intent.

Management device 10 may obtain updated state data indicative of updated statuses of the resources, comparing the updated state data from the resources to the resource selector criteria to determine whether the intent has been downgraded. When the update state data for the previously configured resource no longer meets the resource selector criteria, management device 10 may downgrade the intent, and identify another resource (which may be referred to as a replacement resource) to be used in place of the insufficient resource. Management device 10 may identify the replacement resource by again applying the resource selector criteria to the updated state data. Management device 10 may next configure, when re-provision the service within the network 2, the replacement resource, thereby providing intent assurance, which may refer to maintaining or otherwise managing the intent to ensure adequate service levels for the intent.

In some examples, management device 10 may use YANG modeling for defining the high-level configuration data in terms of intents, and transforming the high-level configuration data into the low-level device configuration data specific to the selected resource. Modern systems may support intents to ease the management of networks, where the intents may be declarative. To realize the intents, management system 10 may select the optimal resources (within the context of the resource selector criteria). The techniques set forth in this disclosure may define the approach for extensibility/programmability of the intent models and resource selections in intent compilation.

When administrators 12 submit the intent in the form of a policy, management system 10 may select the resources in intent compilation and generate the low-level configuration data that is specific to the selected resource, thereby allowing a programmatic way to define the resource selection criteria. Management device 10 may automatically register for the selected resources state changes, and thereby provide assurance/closed loop control as discussed above. For example, when the intent is degraded, management system 10 may select the correct replacement resources and generate the low-level configuration data specific to the replacement resources, thereby programmatically defining intent assurance logic.

Figure 2:
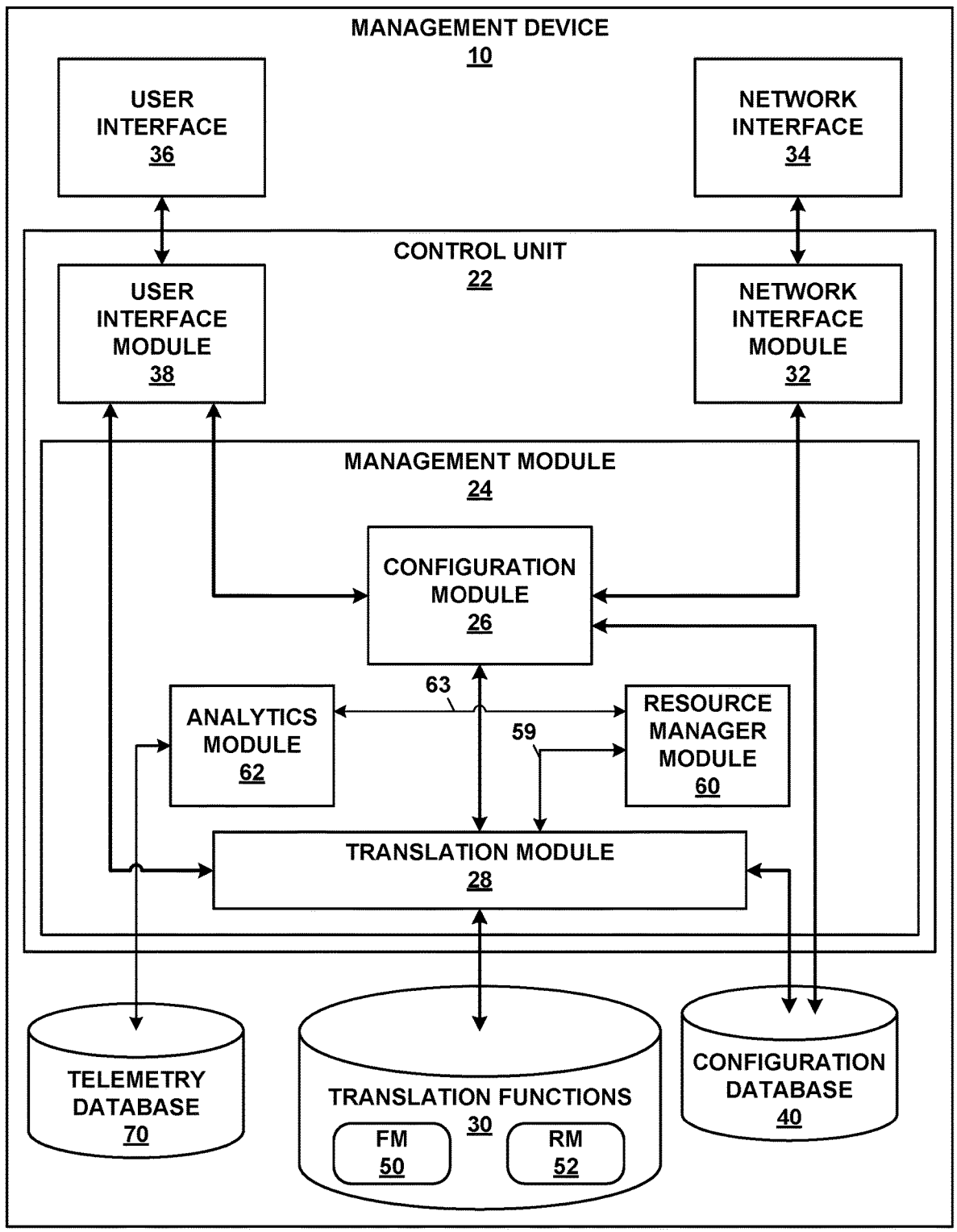
FIG. 2 is a block diagram illustrating an example set of components for the management device of FIG. 1.

FIG. 2 is a block diagram illustrating an example set of components for the management device of FIG. 1. In this example, management device 10 includes control unit 22, network interface 34, and user interface 36. Network interface 34 represents an example interface that can communicatively couple management device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n/ac or other such wireless protocols). Management device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with management device 10, e.g., to provide input and receive output. For example, user interface 36 may represent one or more of a monitor, keyboard, mouse, touchscreen, touchpad, trackpad, speakers, camera, microphone, or the like. Furthermore, although in this example management device 10 includes a user interface, it should be understood that administrator 12 need not directly interact with management device 10, but instead may access management device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in a combination of software (including firmware and/or middleware) and hardware (e.g., a processor).

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive high-level configuration instructions or other high-level configuration data for a set of managed network devices from a user, such as administrator 12. Over time, the user may update the configuration instructions, e.g., to add new intents, remove existing intents, or modify existing intents performed by the managed devices. The high-level configuration instructions may be structured according to, as one example, the Yet Another Next Generation (YANG) data modeling language. In some examples, management module 24 also provides administrator 12 with the ability to submit translation functions that translation module 28 executes to transform high-level configuration instructions to device-specific, low-level configuration instructions or other low-level configuration data, as discussed below.

Management device 10 also includes configuration database 40. Configuration database 40 generally includes information describing managed network devices, e.g., elements 14. For example, configuration database 40 may include information indicating device identifiers (such as media access control—MAC—and/or internet protocol—IP—addresses), device type, device vendor, devices species (e.g., router, switch, bridge, hub, etc.), or the like. Configuration database 40 also stores current configuration information (e.g., high-level configuration information, or in some cases, both high-level configuration and low-level configuration information) for the managed devices (e.g., elements 14).

Translation module 28 determines which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions.

Configuration module 26 may first determine an existing set of high-level configuration information for each service performed by the devices for which configuration is to be updated, e.g., by retrieving the existing set of high-level configuration information for each of the services from configuration database 40. Configuration module 26 may then compare the existing set of high-level configuration information to the newly received set of high-level configuration information, and determine differences between the existing and newly received sets of high-level configuration information. Configuration module 26 may then pass information indicative of these differences to translation module 28, for translation into respective sets of low-level configuration information. Configuration module 26 also updates the existing high-level configuration information recorded in configuration database 40 based on the newly received set of high-level configuration information.

Translation module 28 may generate two different types of translation functions 30, which are referred to above as forwarding mappings and reverse mappings. In the example of FIG. 2, the forward mappings are denoted "FM 50," while the reverse mappings are denoted as "RM 52." Translation module 28 may automatically generate RM 52 from corresponding ones of forward mappings 50 using a translation script (which is not shown in the example of FIG. 2 for ease of illustration purposes) defined in accordance with a translation language, as described in more detail in the incorporated U.S. patent application Ser. No. 15/198,657.

As further shown in the example of FIG. 1, management module 24 also includes a resource manager module 60 and an analytics module 62. Resource manager module 60 may represent a module configured to identify one or more resources based on resource selector criteria 59. That is, configuration module 26 may receive a policy that includes high-level configuration data identifying one or more intents (which, in some examples, are declarative) specifying a network service to be provisioned within network 2. Configuration module 26 may provide the intents to translation module 28, which may compile the intents into low-level configuration data specific to a particular one of elements 14. Translation module 28, in order to compile the intents, may extract resource selector criteria 59 from the high-level configuration data and provide resource selector criteria 59 to resource manager module 60.

Resource manager module 60 may maintain an inventory of available resources, which it updates through interactions with analytics module 62. Analytics module 62 may represent a module configured to interface with elements 14 via network interface module 62 and network interface 34 in order to obtain telemetry data. As further shown in the example of FIG. 2, management device 10 may further include a telemetry database 70, which stores the telemetry data obtained from elements 14. Resource manager module 62 may request that analytics module 62 provide different types of the telemetry data stored to telemetry database 70. The telemetry data may include any data describing a state of elements 14, including a number of packets transmitted, a number of packets received, a role, a number of sessions, a latency, a number of packets dropped, a capability to support a particular routing or other network protocol, and the like.

Resource manager module 62 may request a particular type of the telemetry data (which is representative of the state of elements 14, and as such may also be referred to as "state data") based on resource selector criteria 59. That is, resource manager module 62 may, as one example, request a number of active BGP sessions for elements 14 when resource selector criteria 59 indicates that a resource with less than 1000 BGP sessions is required to support an intent. As another example, resource manager module 62 may request latency metrics for elements 15 when resource selector criteria 59 indicates that a minimum latency is required to support an intent.

Analytics module 62 may receive the request from resource manager module 60 and access telemetry database 70 to retrieve the requested telemetry data. Analytics module 62 may provide the requested telemetry data as telemetry data 63. Resource manager module 60 may next apply resource selector criteria 59 to telemetry data 63 in order to identify which resources are to be used in support of the intent (which is, in other words, a declaration of which service is to be provisioned). Resource manager module 60 may interface with translation module 28 to provide the identified resources. Translation module 28 may then identify one or more of forward mappings 50 associated with the identified resources, and apply the identified one or more of forwarding mappings 50 to the high-level configuration data to obtain the low-level configuration data specific to the one or more identified resources.

Translation module 26 may interface with the configuration module 26 to provide the low-level configuration data and an indication to which of elements 14 the low-level configuration data is to be applied. Configuration module 26 may then interface with the identified ones of the elements 14 to configure, when provisioning the service in network 2, the determined resource using the low-level configuration data specific to the determined resources.

Analytics module 62 may periodically poll (or otherwise obtain) updated state data in the form of updated telemetry data, which analytics module 62 may store to telemetry database 70. Responsive to receiving updated telemetry data, analytics module 62 may interface with resource manager module 60 to indicate that updated telemetry data has been obtained. In some examples, telemetry database 70 may include functionality to enable resource manager module 60 to subscribe to particular telemetry data and thereby automatically receive indications when subscribed-to-telemetry data has been updated. Furthermore, although described in terms of a periodic pull, analytic module 62 may obtain the updated telemetry data in other ways, such as by way of a push model in which elements 14 are configured to provide updated telemetry data responsive to any changes or any changes that exceed some threshold amount of change, etc.

In any event, resource manager module 60 may determine, based on updated state data 63 identifying an updated status (or in other words, state) and resource selector criteria 59, whether the determined resource is to continue to support the service. Responsive to determining that the determined resource is to continue to support the service, resource manager module 60 may refrain from adapting or otherwise readjusting the provisioned service. Resource manager module 60 may, responsive to determining that the determined resource is not to continue to support the service and based on resource selector criteria 59 and updated state data 63, determine a replacement resource to support the service. Resource manager module 60 may interface with translation module 28 to initiate the translation of the high-level configuration data to low-level configuration data specific to the determined replacement resource. Translation module 28 may provide the low-level configuration data specific to the determined replacement resource to the configuration module 26, which may interface with the determined replacement resource to configure, when re-provisioning the service in network 2, the determined replacement resource using the low-level configuration data specific to the determined replacement resource.

Figure 3:
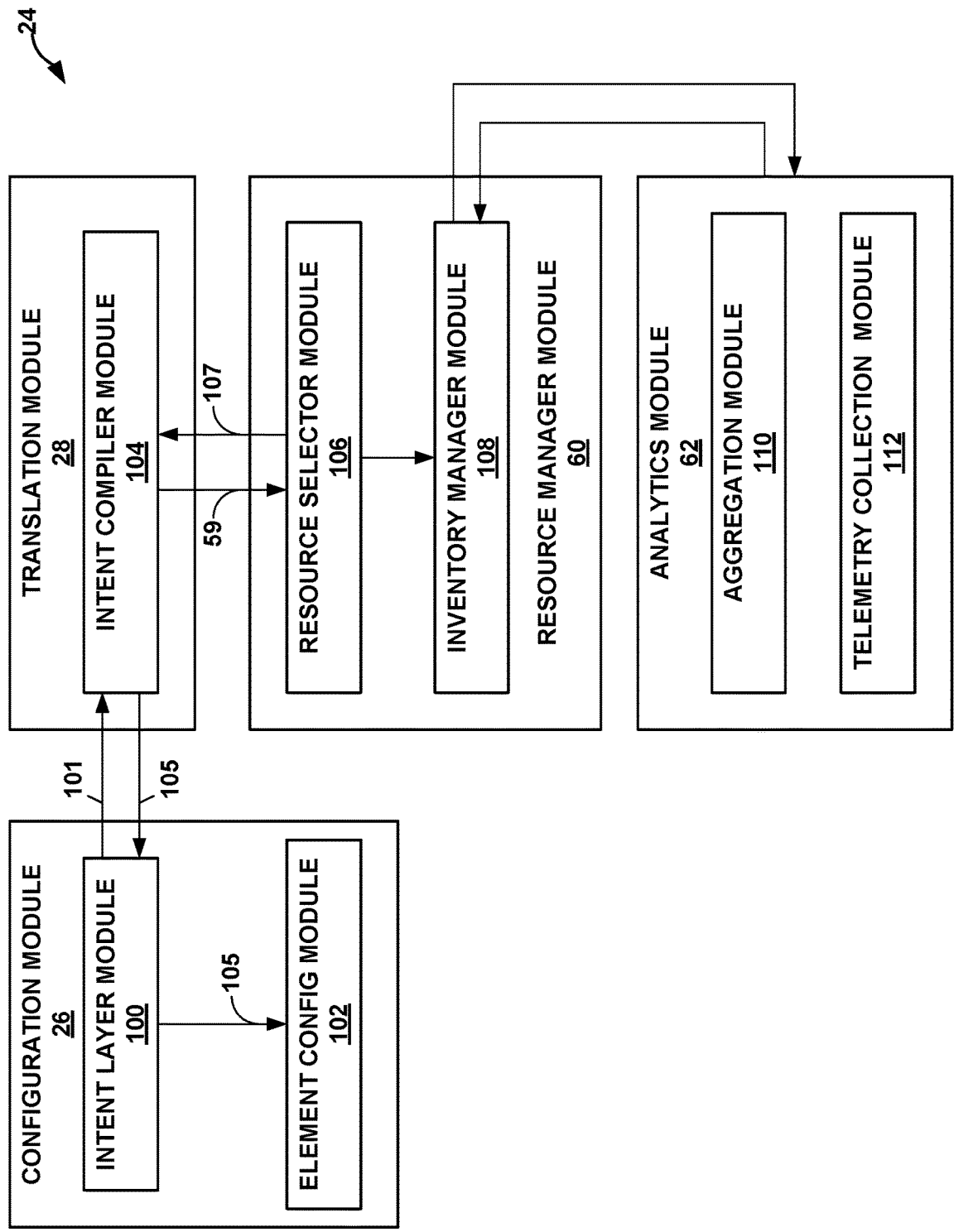
FIG. 3 is a block diagram illustrating the management module shown in FIG. 2 in more detail.

FIG. 3 is a block diagram illustrating the management module shown in FIG. 2 in more detail. As shown in the example of FIG. 3, configuration module 26 includes an intent layer module 100 and an element configuration module ("element config module") 102. Intent layer module 100 may manage the intents specified in one or more policies. Although not shown in the example of FIG. 3, intent layer module 100 may store the intents to an intent database or other data structure. Intent layer module 100 may manage the process of transforming intents from high-level configuration data 101 into low-level configuration data 105. Element config module 102 may represent a module configured to configure elements 14 using low-level configuration data 105 specific to particular one of elements 14.

As further shown in the example of FIG. 3, translation module 28 may include an intent compiler module 104, which may represent a unit configured to translate high-level configuration data 101 (representative of one or more intents) into low-level configuration data 105. During translation of high-level configuration data 101 into low-level configuration data 105, intent compiler module 104 may identify resource selector criteria 59 (which may be specified as resource matching filters in the forward mappings 50). In other words, administrators 12 may define resource selector criteria 59 in the translation logic (e.g., forward mappings 50), which intent compiler module 104 may parse from forward mappings 50.

As further shown in the example of FIG. 3, resource manager module 60 includes a resource selector module 106 and an inventory manager module 108. Resource selector module 106 may represent a module configured to select, based on resource selector criteria 59 one or more resources 107. Intent compiler module 104 may obtain resource selector criteria 59 from forward mappings 50 and invoke resource selector module 106, passing resource selector criteria 59 to resource selector module 106. Resource selector module 106 may, in turn, invoke inventory manager module 108, which may represent a unit configured to discover resources within network 2 and maintain such resources as an inventory of resources, updating the status of the resources based on telemetry data stored to telemetry database 70.

Inventory manager module 108 may discover resources (which may include resources and resource pools) from a device schema. The device scheme may include a "Resource extension," which may represent the resource, an example of which follows.

```
leaf if-name{
    type if-name-type;
    ext:resource{
        resource-key '/device/device-id'
        ext:load-factor{
            ext: load-factor-key '/device/interface/
                operation/if-in-traffic'
            ext:load-factor-weightage "0.75"
        }
        ext:load-factor{
            ext:load-factor-key '/device/interface/
                operation/if-out-traffic'
            ext:load-factor-weightage "0.25"
        }
    }
}
```

In the above, "resource" refers to an extension to define an element as a resource, while "resource-key" may allow for resources to be hierarchically defined. For example, a device may include one or more "port" resources. Each port resource may include one or more "unit" resources. In some instances, the device schema may provide a way by which to specify a range of resource units in a given context. Resource-key may represent the parent resource key path. In some examples, a resource is a simple value. Also, when the device-id is the key for an interface-name resource, then the same interface-name on a device may not be assigned to two services. A resource-key may be optional.

Furthermore, a "resource-type" may signify the resource type. There may be multiple resource types (e.g., L2 resources, L3 overlay resources, etc.). The resource-type may be optional (e.g.: "Virtual-circuit" is "L3 overlay resource"). A "load-factor" may refer to an extension that enables the load on the resource to be derived. The load-factor may contains the "metric" path and the "weightage," where the weightage is applied to the identified metric to obtain load. The "resource-metrics" extension refers to the operational state (or, in other words, status) metrics.

The device schema may also define complex resource metrics. For example, there can be resource metrics that are derived across different endpoints. For example, a virtual circuit is a network wide "point to point" overlay construct. This resource metric would be derived from both the endpoints. The metrics may, for example, include received packets and transmitted packets (rx-pps, tx-pps). In this example, rx-pps for one endpoint can be derived from the other endpoints "transmitted packets".

The following extension may be used to represent complex metric.

```
ext:resource {
    ext:complex-metric {
        ext:equator-merge-rule;
        ext:metric -name "rx-pps"; //This metric would
    be
    derived from other endpoint tx-pps
        ext:metric-path: ['/device/virtual-circuit /tx-pps"]
    }
}
```

By default, management system 10 may define "equator" "resource merge strategies," where the resource Merge strategies may specify how the resources are to be merged. The equator-merge rule may map the resources, when the resource key is the same. The device schema may enable custom merge rules to be defined, which can be used for comparing the resources to identify which instances can be merged, to derive complex metrics, an example of which follows.

```
ext:resource {
    ext:complex-metric {
        ext:custom-merge-rule;
        ext:matcher-script "scripts.CustomResourceMatcher";
//Script that relates the resource across endpoints.
        ext:metric -name "rx-pps";
        ext:metric-path: ['/device/virtual-circuit /tx-pps"]
    }
}
```

The device schema may also enable resource pool discovery, where there can be a pool of resources in a context. For example, consider an interface which contains a unit 1-4094 resources. A YANG element that has a "range" defined would be the pool of resources.

To populate the inventory, inventory manager module 108 may traverse the device schema according to the following pseudo-code:

For every Yang-element in Element configuration schema
    If resource extension present
        Create Resource type with
    Resource key
    Pool- if the YANG element has range defined.
    Load-factor-key & weightage.
    Custom metrics.

Resource selector module 106 may ensure resource persistence and get the next available resource in an efficient way, as follows:

Resource manager centrally assign the resources to the Intents/service; and

Resource manager should be assigning the resources in near real time.

An example of the foregoing is as follows:

In case of service provider deployments, resources are specified as follows:

Devices (PE, CE endpoints . . . )

Interfaces

Unit interfaces for every physical interface-ge-0/0/1 to ge-0/0/48

There are the following two aspects to this:

How to store the resources in an efficient way in a database;

If the units are 1 to 4094, system should not add all entries in the database, because there are many ports, and each port can have 1-4094 units.

The problem then becomes how to get the next available resource in an efficient way, which is solved by the following example algorithm. Although a bit map could be used to identify the next resource, use of bit maps may introduce performance bottle necks. In some examples, the techniques set forth in this disclosure may follow a commit log type of data structure, where the allocated resources are kept. When the next resource request comes, the in-memory resource queue gives the next available resource. A separate thread keeps purging the queue in the bitmap after the queue overloads. Resource manager module 60 may maintain the assigned resources in following database tables.

Memory Data Structure:

Resource queue—Maintains the first "n" available resources.

Resource-memory table: resource, Assigned service

Database:

Resource Table: Resource, Assigned Service

Resource-log table: Resource-id, Acquire/release state

Resource-bitmap table—Parent-Resource-id, resource-type, resource bit-map

Figure 4:
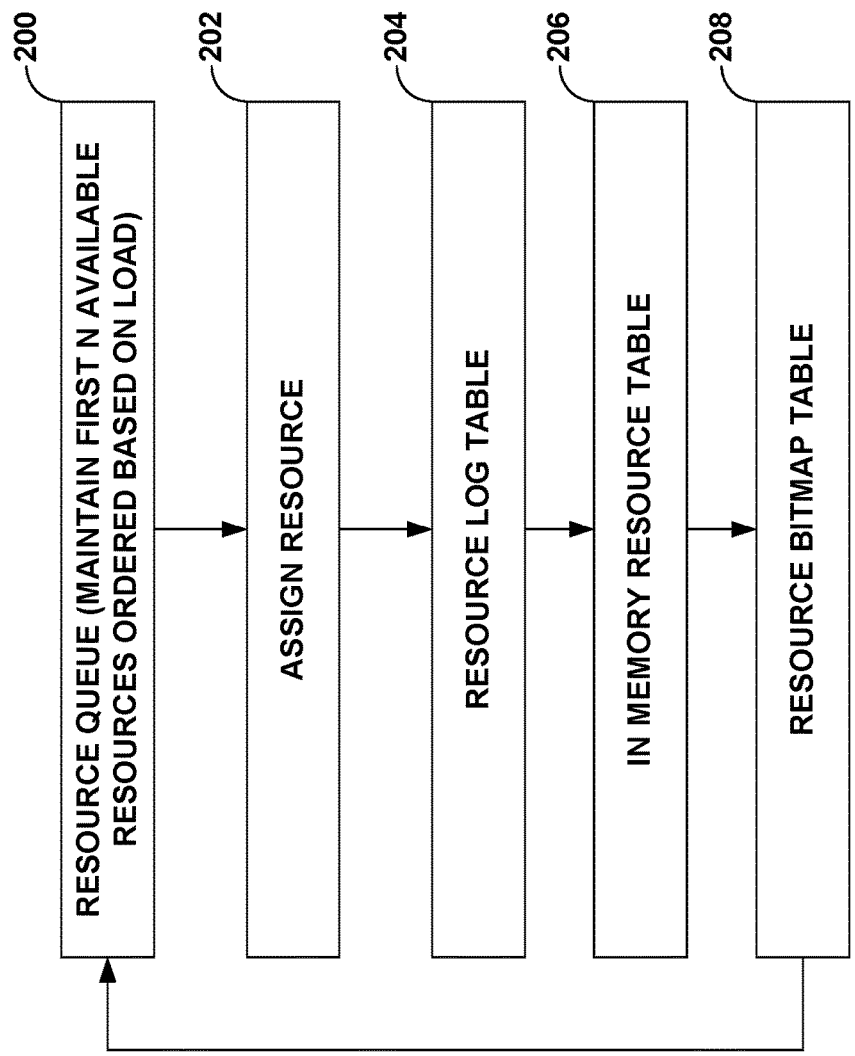
FIG. 4 is a flowchart illustrating resource allocation according to various aspects of the techniques described in this disclosure.

Resource manager module 60 may use a bitmap in the database to keep track of "used resource" vs "available resource", and to provide efficient persistence of resource usage information in the database. However, the above step would serialize the "resource allocation". To avoid serialization, in some examples resource manager module 60 may execute according to the following steps, which are shown in more detail in FIG. 4. FIG. 4 is a flowchart illustrating resource allocation according to various aspects of the techniques described in this disclosure.

Cache in the resource queue the first N available resources (ordered based on load) and the usage status in memory (200).

Introduce "resource log" table to support hardware failures.

If the Resource manager assign the resource to a service (202), add to resource-log table (204).

Based on certain Threshold (number of Resource assigned entries) purge the cache to "Resource table" and "Resource-bit map" table (206, 208).

In case of hardware failure, read the entries from the resource-log table and update the "Resource table" and "Resource-bit map" table (200).

Returning back to the example of FIG. 3, in some examples, multiple services may be running on same resource, e.g., multiple L3 VPNs may use the same interface child resources (unit interface). As such, resource manager module 60 may forecast the utilization of the resource, so that services would be migrated to different resources prior to the service failing to meet the service level agreement (SLA) due to network congestion or other reasons. Resource forecasting involves the following steps:

Identify the state attributes corresponding to the resource.

Create samples of a pre-configured sample size (>30)

Now, confidence interval is calculated on the mean value of the parameter

Sample interval=m (+ or −) (z*s/sqrt(n)), here m—mean of the current sample, s—standard deviation, n—sample size Here z is calculated from the (pre-configured) % of the confidence. Ex: For a 95% confidence interval, z=1.96 (95% is the default)

To illustrate, consider the following example:

Incoming traffic percentage of an interface is the parameter to be forecast. Assume, for purposes of illustration, that the interface resource is dependent on this parameter.

Analytics module 62 may periodically poll the interface utilization parameter (that is, the analytics module 62 includes a telemetry collection module 112 that represents a module configured to poll elements 14 to collect the parameters, or in other words, metrics) and samples of size 30 parameters are grouped (that is analytics module includes an aggregation module 110 that represent a module configured to aggregate different parameters, or in other words, metrics) and the mean and standard deviation are calculated for each sample (by the aggregation module 110.

If the calculated mean is greater than the upper bound of the confidence interval, resource selector module 106 determines a replacement resource and migrates one or more of the services supported by the original resource to the replacement resource. Similarly, resource manager module 60 may select the resource to support more services when the mean falls below the confidence interval range.

Resource manager module 60 may track for any flapping in the migration and trends, and suggest the user to optimize the sample size and confidence interval constant (percentage of confidence).

In this way, inventory manager module 108 may discover resources within network 2, and maintain the inventory (e.g., in an inventory database). Resource selector module 106 may then identify resources that meet or exceed resource selector criteria 59. In some instances, inventory manager module 108 may apply the above noted weights to the corresponding resource metrics to obtain the corresponding resource load. Inventory manager module 108 may then provide the resource load to the resource selector module 106, which may determine, based on application of resource selector criteria 59 to the resource loads, the resources to support the service.

Resource selector module 106 may obtain the resource selector criteria from a resource selector query. Resource manager module 106 may assign optimized resources (in terms of meeting or exceeding resource selector criteria 59) as part of translation of the intent (e.g., high-level configuration data 101). The resource selector query follows the filter syntax, where the sample data model and corresponding resource selector are shown as one example below.

```
Module resources {
......
    typedef devicerole{
        type enumeration {
            enum PE{
                description "core";
            }
            enum CE{
                description "edge";
            }
        }
    }
    list site{
    .....
        list device{
            key device-id;
            leaf device-id {
                type leafref {
                    path "/device/device-id";
                }
            }
            leaf role {
                type devicerole;
            }
        }
    }
}
```

In the example above, the "site" vertex has reference to a few devices, where the leaf device has a device role ("devicerole") property.

The resource selector criteria, when populated, follows the above data model, as shown in the example below.

```
site(name:"Bangalore") {
    @Resource("PE") device(role:"PE", bgp-session-count<1000))
{ //"@Resource" signify it is a resource with name PE.
        id,
        @Resource("PE-Port") interface (min:latency) { //"@Resource"
signify it is a resource with name PE-PORT
            name
        }
    }
}
```

Directives provide an example way to describe alternate runtime execution and type validation behavior in a Graph Query Language ("GraphQL") document. A "resource" directive may signify that the resolved variable is a resource. The resource directive may take the tag that is an alias for the resource, as shown below.

Definition:

Resource "<resourcealias>"

Turning to the optimization expression and parameters used in the resource selector query, there may be optimization decision variables specified in the arguments of "resource" directive attribute. Resource selector module 106 may derive the following optimization decision variable from the query:

Decision variables
Objective; and
Constraints

The Objective bounds and constraints may be specified as an "optimization expression," an example syntax of which is provided below:

Optimization Function: Optimize(Objectives, Constraints);

Objective: min, max, avg

Constraints/Bounds: Limits on the Resource metrics—<=, = or >=

Resource selector module 106 may, in this way, obtain resource selector criteria 59, and apply resource selector criteria 59 to the resources obtained from inventory manager module 108 to thereby obtain a resource 107 that will support the service. Intent compiler module 104 may then proceed to translate high-level configuration data 101 to low-level configuration data 105 specific to resource 107. Intent layer module 100 may pass the low-level configuration data 105 to element config module 102, which may interface with element 14 that includes resource 107 to configure element 14 using low-level configuration data 105 to support the service within network 2.

To illustrate how the resource manager derives the optimization constraints and objectivizes, consider the following example.

```
{
    site(name:"Bangalore") {
        @Resource("PE") device(role:"PE", min:latency, bgp-session-
            count<1000)) { id,
            @Resource("PE-Port") interface ( ) {
                name
            }
        }
    }
}
```

In the above resource selector query, the device resource includes:

Decision variables-latency, bgp-session-count
Objective: Min latency
Constraint: bgp-session-count<1000

The foregoing can be represented by the following pseudocode:

For every element in Resource selector query:
    Call "resolver" and get the matching Objects//Resolver is a function in Graph QL to get the matching objects.
    Populate the "Resource selection criteria"//Specified as Arguments in every element in query
    If "resource directive" is present
    Read the alias of the resource
    Read the optimization decision variables
    Run the Optimization and select the resource
    Assign the resource to alias
    Interface with Inventory module
    Register for the notifications for the "resource selected criteria".

As discussed above, resource manager module 60 may invoke analytics module 62 in order to obtain the telemetry data (representative of the state data), which may result in various changes to the resources. For example, assume a PE role change to the device requires a new resource to be assigned to the intent. The following pseudo-code illustrates what occurs when there is a change to the inventory (such as an element state data) in a polling-based model.

```
For every change in Inventory
    Check if the change is matching Resource criteria
    Select new resource and apply to Intent.
Interface with Analytics node
    To enable the monitoring for the required properties on resources
    Listen for the metrics from the Analytics nodes through
        message bus.
To configure the events on Analytics node for the Thresholds.
Listen for the threshold crossing events and run the optimization module.
```

The following provides pseudo-code for obtaining updates to resources in a subscription-based model:

```
For every element in Resource selector query
    If "resource directive" is present
        Read the optimization decision variables
        Subscribe for the Threshold for the constraint
        Listen for the objective metric.
```

Resource constraint semantics may be present in an intent data model, which can be specified within the resource mapping constraints.

Some of the use cases are:

L3 VPN should have MPLS enabled devices alone.

The Ports of loop back address should be used.

These resource constraints can be modeled with in the Yang using leafref to the resource.

The resource-filter follows the filter query syntax, which is shown in the following example:

```
leaf device-id {
    type leafref {
        path "/oc-device/device-id";
        resource-filter:"oc-device(isMpls:true) {@Resource device-id}
        description "Device Id";
    }
}
```

In some instances, the resource constraints may be based on the context. The service model may contain a device and an interface. The interface may be based on the device that is selected. In those cases, the leafref path would contain the context, as follows.

```
Leaf interface {
    type leafref {
        path "/oc-device/device/interface/name";
        weak-reference;
        resource-filter
            "/oc-device/device[../$device-id]/interface(loop-back:true){
            @Resource name}";
            //Check for the interface name of type loop back.
    }
    description "Interface";
}
```

In the above example, management device 10 may assist administrators 12 in the selection of an interface, where the administrators 12 may define a particular loop-back address to select a certain interface, and management device 10 may generate the appropriate configuration to configure the interface. In this respect, the techniques may permit system-assisted user selection.

To define an intent that includes automatic resource selection, administrator 12 may create an Intent YANG data model, and provide a translation script along with Resource selector query. To illustrate consider the following example:

Intent: L2 point to point connectivity between "site-A" and "site-B" with high bandwidth guaranteed Intent Realization: As part of "service layer Intent realization", management system 10 may select the PE devices with "less load" and configure "L2 circuit" between site-A and site-B.

In this example, administrator 12 may define the Intent Yang Data model as follows:

```
module L2P2P{
    namespace "http://YANG.juniper.net/atom-resource-manager ";
    prefix csp-ss;
    import ietf-inet-types {
        prefix inet;
    }
    import ietf-YANG-types {
        prefix YANG;
    }
    organization
        "Juniper Networks";
    {
    description
        "First pre-beta.";
    }
    List L2P2P {
        key "service-name";
            description "L2 point to Point";
            leaf service-name {
                type string;
                mandatory true;
                description "Name of the service";
            }
            leaf endpointA{
                type leafref {
                    path "/site";
                }
            mandatory true;
                description "endpoint A";
            }
        leaf endpointB{
            type leafref {
                path "/site";
            }
            mandatory true;
                description "endpoint B";
            }
    }
```

The intent translation script may include one or more of python code, a mapper, and a template, which would include the resource selector query. The following is an example of a mapper (the context and use of which is described in more detail in the above incorporated U.S. patent application Ser. No. 15/198,657).

```
<mappings srcschema="L2P2P " targetschema="oc-device">
    <oc-device loop-context="#l2p2p #" resource= Resourceselector(
    site(name: # endpointA #) { @Resource("PEA") device(role:"PE")
    {device-id, interface
    @Resource("PEA-Port") (min:latency) {name}}}) >
        <device-id>resource( "site/device//device-id")</device-id>
        <configuration>
            <network-instances>
                <name>append(':', 'target', resource("site/device/
                interface/name"))</name>
                .....
            </network-instances>
        </configuration>
    </oc-device>
    <oc-device loop-context="#l2p2p #" resource= Resourceselector(
    site(name: # endpointB #) { @Resource("PEB") device(role:"PE")
    {device-id, interface
    @Resource("PEB-Port") (min:latency) {name}}}) >
        <device-id>resource( "site/device//device-id")</device-id>
        <configuration>
            <network-instances>
                <name>append(':', 'target', resource("site/device/
                interface/name"))</name>
                .....
            </network-instances>
        </configuration>
    </oc-device>
</mappings>
```

Figure 5:
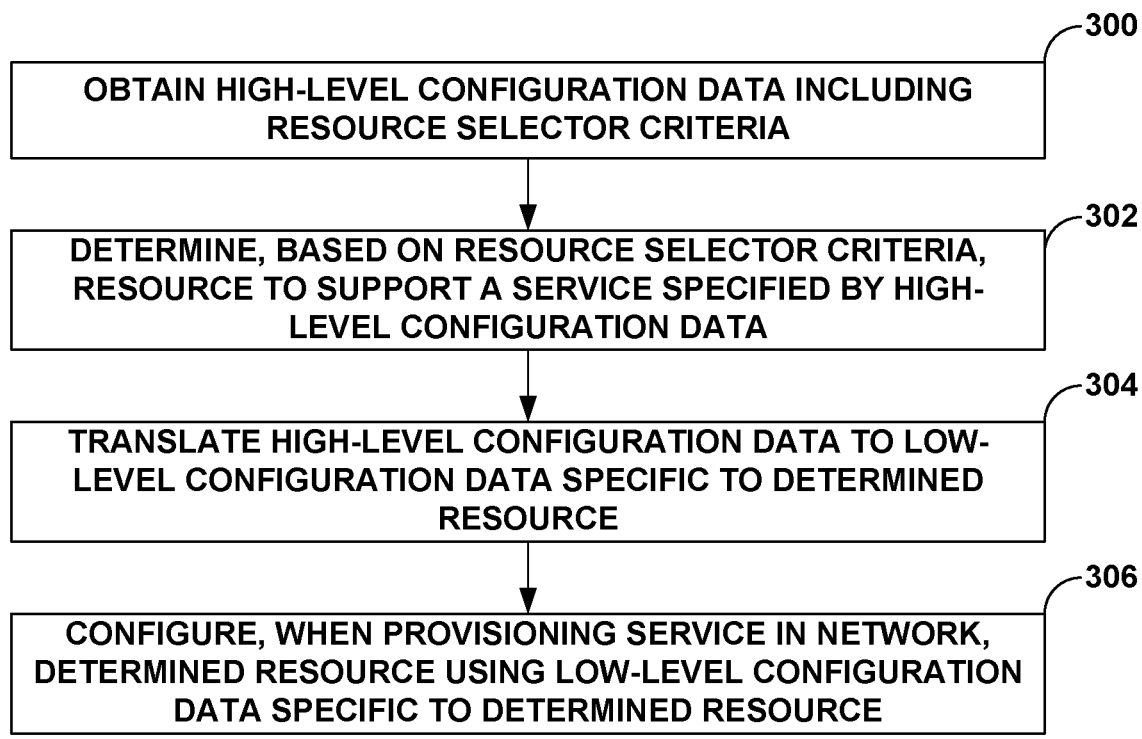
FIG. 5 is a flowchart illustrating example operation of the management system shown in FIGS. 1-3 in performing various aspects of the automatic intent provisioning techniques described in this disclosure.

FIG. 5 is a flowchart illustrating example operation of the management system shown in FIGS. 1-3 in performing various aspects of the automatic intent provisioning techniques described in this disclosure. Management device 10 may automatically provision and manage intents set forth by policies used for managing computer network 2.

As described above, when processing the intent, the techniques may enable management device 10 or other device provisioning system to obtain high-level configuration data 101 that includes resource selector criteria 59 defined using an extensible set of commands (300). Management device 10 may automatically identify, using the resource selector criteria, one or more resources that are to be configured to support the network service identified by the intent. In other words, management device 10 may determine, based on resource selector criteria 59, a resource 107 to support a service specified by the high-level configuration data (302). Management device 10 may next translate high-level configuration data 101 into low-level configuration data 105 specific to resource 107 (304). Management device 10 may configure, when provisioning the service in network 2, determined resource 107 using low-level configuration data 105 specific to determined resource 107 (306).

The process may be repeated in response to changing state (or, in other words, status) of elements 14. That is, management device 10 may maintain a resource database and provide an interface by which to collect and update various different resources and the current status of each of the resources. The various resources may report state data indicative of a current status of the resources to management device 10 (and/or management device 10 may poll the resources to obtain the state data), where management device 10 may update the database to store the state data and thereby maintain the current status of each of the resources. Management device 10 may select, based on application of the resource selector criteria to the state data, the resources (302), perform the translation (304), and configure, when provisioning the network service in the network 2, the selected resources (306), thereby automatically provisioning the intent.

Management device 10 may obtain updated state data indicative of updated statuses of the resources, comparing the updated state data from the resources to the resource selector criteria to determine whether the intent has been downgraded. When the update state data for the previously configured resource no longer meets the resource selector criteria, management device 10 may downgrade the intent, and identify another resource (which may be referred to as a replacement resource) to be used in place of the insufficient resource. Management device 10 may identify the replacement resource by again applying the resource selector criteria to the updated state data (302). Management device 10 may next perform the translation (304), and configure, when re-provision the service within the network 2, the replacement resource (306), thereby maintaining or otherwise managing the intent to ensure adequate service levels for the intent.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

The invention claimed is:

1. A method comprising:
obtaining, by a management device configured to manage operation of a plurality of potential resources, a policy that includes high-level configuration data defining a service to be deployed within a network, the high-level configuration data including resource selector criteria that identifies one or more criteria for selecting a resource to support the service from the plurality of potential resources and defines, using an extensible set of commands, the resource selector criteria;
obtaining state data identifying a status of each of the plurality of potential resources;
determining, by the management device and based on application of the resource selector criteria to the state data, the resource to support the service from the plurality of potential resources;

translating, by the management device, the high-level configuration data to low-level configuration data specific to the determined resource; and configuring, by the management device and when provisioning the service in the network, the determined resource using the low-level configuration data specific to the determined resource.

2. The method of claim 1, wherein the high-level configuration data includes an intent specifying the network service and includes the resource selector criteria.

3. The method of claim 1, wherein determining the resource comprises automatically determining, without manual intervention and based on application of the resource selector criteria to the state data, the resource from the plurality of potential resources.

4. The method of claim 1, further comprising:
obtaining updated state data identifying an updated state of each of the plurality of potential resources;
determining, based on the updated state data and the resource selector criteria, whether the determined resource is to continue to support the service;
determining, responsive to determining that the determine resource is not to continue to support the service and based on the resource selector criteria and the updated state data, a replacement resource to support the service;
translating the high-level configuration data to low-level configuration data specific to the determined replacement resource; and
configuring, when re-provisioning the service in the network, the determined replacement resource using the low-level configuration data specific to the determined replacement resource.

5. The method of claim 1,
wherein the state data identifies one or more resource metrics that are defined using an extensible set of commands, and a corresponding one or more weights,
wherein the resource metrics identify an operational state of a corresponding resource of the plurality of potential resources, and
wherein determining the resource comprises:
applying the one or more weights to the corresponding one of the resource metrics to obtain one or more corresponding resource loads; and
determining, based on application of the resources selector criteria to the resource loads, the resource to support the service from the plurality of potential resources.

6. The method of claim 1, further comprising determining, based on a device schema, the plurality of potential resources.

7. The method of claim 1, wherein determining the resources comprises:
determining, based on application of the resource selector criteria to the state data, one or more of a decision variable, an objective, and a constraint;
applying the one or more of the decision variable, the objective, and the constraint to the plurality of potential resources to determine the resource to support the service.

8. A device configured to manage a plurality of potential resources, the device comprising:
one or more processors configured to:
obtain a policy that includes high-level configuration data defining a service to be deployed within a network, the high-level configuration data including resource selector criteria that identifies one or more criteria for selecting a resource to support the service from the plurality of potential resources and defines, using an extensible set of commands, the resource selector criteria;
obtain state data identifying a status of each of the plurality of potential resources;
determine, based on application of the resource selector criteria to the state data, the resource to support the service from the plurality of potential resources;
translate the high-level configuration data to low-level configuration data specific to the determined resource;
a memory configured to store the low-level configuration data specific to the determined resource; and
an interface by which to configure, when provisioning the service in the network, the determined resource using the low-level configuration data specific to the determined resource.

9. The device of claim 8, wherein the high-level configuration data includes an intent specifying the network service and includes the resource selector criteria.

10. The device of claim 8, wherein the one or more processors are configured to automatically determine, without manual intervention and based on application of the resource selector criteria to the state data, the resource from the plurality of potential resources.

11. The device of claim 8, wherein the one or more processors are further configured to:
obtain updated state data identifying an updated state of each of the plurality of potential resources;
determine, based on the updated state data and the resource selector criteria, whether the determined resource is to continue to support the service;
determine, responsive to determining that the determine resource is not to continue to support the service and based on the resource selector criteria and the updated state data, a replacement resource to support the service;
translate the high-level configuration data to low-level configuration data specific to the determined replacement resource; and
configure, when re-provisioning the service in the network, the determined replacement resource using the low-level configuration data specific to the determined replacement resource.

12. The device of claim 8,
wherein the state data identifies one or more resource metrics that are defined using an extensible set of commands, and a corresponding one or more weights,
wherein the resource metrics identify an operational state of a corresponding resource of the plurality of potential resources, and
wherein the one or more processors are configured to:
apply the one or more weights to the corresponding one of the resource metrics to obtain one or more corresponding resource loads; and
determine, based on application of the resources selector criteria to the resource loads, the resource to support the service from the plurality of potential resources.

13. The device of claim 8, wherein the one or more processors are further configured to determining load characteristics for each of the plurality of potential resources,
wherein the one or more processors are configured to determine, based on the load characteristics and application of the resource selector criteria to the state data, the resource to support the service from the plurality of potential resources.

14. The device of claim 8, further comprising maintaining a commit log data structure by which to identify that the resource of the plurality of potential resources has been allocated to support the service.

15. The device of claim 14,
wherein the commit log data structure indicates that the plurality of potential resources are available for allocation in support of the service, and
wherein determining the resource comprises determining, based on the the commit log data and application of the resource selector criteria to the state data, the resource to support the service from the plurality of potential resources.

16. A non-transitory computer-readable storage medium having stored thereon instructions that, when executed, cause one or more processors of a management device to:
obtain a policy that includes high-level configuration data defining a service to be deployed within a network, the high-level configuration data including resource selector criteria that identifies one or more criteria for selecting a resource to support the service from a plurality of potential resources and defines, using an extensible set of commands, the resource selector criteria, wherein the management device is configured to manage the plurality of potential resources;
determine, based on application of the resource selector criteria to the state data, the resource to support the service from the plurality of potential resources;
translate the high-level configuration data to low-level configuration data specific to the determined resource; and
configure, when provisioning the service in the network, the determined resource using the low-level configuration data specific to the determined resource.

\* \* \* \* \*